United States Patent [19]

Collet-Billon

[11] Patent Number: 4,951,676
[45] Date of Patent: Aug. 28, 1990

[54] ULTRASONIC ECHOGRAPHY DEVICE WITH REDUCED INTERFERENCE NOISE

[75] Inventor: Antoine Collet-Billon, Paris, France

[73] Assignee: U.S. Philips Corporation, New York, N.Y.

[21] Appl. No.: 347,553

[22] Filed: May 4, 1989

[30] Foreign Application Priority Data

May 31, 1988 [FR] France .............................. 88 07210

[51] Int. Cl.$^5$ .............................................. A61B 8/00
[52] U.S. Cl. ................................. 128/660.01; 73/602
[58] Field of Search ..................... 128/660.07; 73/599, 73/602

[56] References Cited

U.S. PATENT DOCUMENTS

| | | | |
|---|---|---|---|
| 4,697,594 | 10/1987 | Mayo, Jr. .................. | 128/660.07 X |
| 4,729,019 | 3/1988 | Rouvrais ................... | 128/660.07 X |

FOREIGN PATENT DOCUMENTS 2168482  6/1986  United Kingdom ........... 128/660.07

OTHER PUBLICATIONS

"Abstracts, Ultrasonic Imaging and Tissue Characterization Symposium", Ultrasonic Imaging, vol. 10, No. 1, Jan. 1988, pp. 66-67.

"Imagerie Ultrasonore", M. Fink, Revue de Physique Appliquee 18 (1983), pp. 527-556.

Christoph B. Burckhardt; "Speckle in Ultrasound B-Mode Scans"; pp. 1-6; IEEE Transactions on Sonics and Ultrasonics, vol. SU-25, No. 1, Jan. 1978.

Robert M. Haralick, Stanley R. Sternberg and Xinhua Zhuan; "Image Analysis Using Mathematical Morphology", pp. 532-550, IEEE Transactions on Pattern Analysis and Machine Intelligence, vol. PAMI-9, No. 4, Jul. 1, 1987.

Thurston, F. L. et al., "Actual Time Scan Conversion and Image Processing in a Phased Array Ultrasound Imaging System", 1977 UTS Symp. Proc., IEEE.

*Primary Examiner*—Francis Jaworski
*Attorney, Agent, or Firm*—William Squire

[57] ABSTRACT

An ultrasonic echography device, comprising at least one piezoelectric transducer, a stage for transmitting an ultrasonic beam, and a stage for receiving and processing echographic signals e returned to the transducer. The stage for receiving and processing comprises at least one grey-scale morphological filter which comprises elementary erosion filters and dilation filters for processing applied to the echographic signals.

11 Claims, 3 Drawing Sheets

ULTRASONIC ECHOGRAPHY DEVICE WITH REDUCED INTERFERENCE NOISE

The invention relates to an ultrasonic echography device, comprising at least one piezoelectric transducer, a stage for transmitting an ultrasonic beam, and a stage for receiving and processing echographic signals e returned to the transducer.

The invention is used particularly attractively in the field of medical echography, specifically for the formation of images of organs.

The general technical problem to be solved by any ultrasonic echography device of the kind set forth usually consists in that an exact as possible image must be obtained of the object examined, both as regards its contours and as regards the specular walls contained therein.

Various solutions have already been proposed to this general technical problem. Reference is made notably to the article by M. Fink "Imagerie ultrasonore", published in the the Physique Appliquée 18 (1983) pp. 527-556, which exhaustively analyses the various aspects of the formation of echographic images. Even though they often offer satisfactory results, all known solutions nevertheless have given limitations. The determination of the contours of organs and the detection of low-contrast objects are disturbed by constructive and destructive echo interference produced by the multiple scattering points in the object being studied, and this in relation to the coherent nature of the ultrasonic wave transmitted by the piezoelectric transducer. In the acoustic field this parasitic phenomenon is analogous to that which is known as "speckle" in the optical field and which gives rise to "light grains" which are often encountered in laser emission. The principal drawbacks of this interference noise in the ultrasonic field are on the one hand deterioration of the quality of echographic images, notably a loss of detail in the case of low contrasts, and on the other hand a wide frequency band and a strong variance which make customary contour detection methods inefficient.

Therefore, it will be apparent that the reduction of "speckle" is decisive in improving the quality of echographic images. To achieve this various methods have been proposed:

On the one hand there are methods which consist of the treatment of the signal prior to acquisition in order to obtain decorrelation of the speckle. This is, for example the spatial composition (see the article by C.B. Burkhardt in IEEE Trans. Sonics Ultrasonics, SU25 1-6 (1978)). This method generally offers high-quality echographic images. It has the drawback, however, that it necessitates the use of a complex electronic processing device. Moreover, the acquisition time is comparatively long, so that real-time formation of images is precluded.

On the other hand, there are the smoothing methods performed after the formation of the image, for example by means of a low-pass filter which effectively reduces the fluctuations due to speckle, but which introduces a blurr in the images by expanding the contours.

Thus, the technical problem to be solved in accordance with the invention is to propose an ultrasonic echography device which comprises at least one piezoelectric transducer, a stage for transmitting an ultrasonic beam, and a stage for receiving and processing the echographic signals E returned to the transducer, which ultrasonic echography device would be of the "signal aftertreatment" type, but reduces the speckle effect substantially while maintaining distinct image contours.

In accordance with the present invention, this problem is solved in that the receiving and processing stage comprises at least one grey-tone morphological filter with a structure element g in a domain D and realised by means of elementary erosion and dilation means applied to said echographic signals.

Mathematical morphology and its application to image processing are known from the work by J. Serra "Image analysis and mathematical morphology" Academic Press, 1982 and from IEEE Transactions on Pattern Analysis and Machine Intelligence, Vol. PAMI-9, No. 4 (July 1987), pp. 532-550. These documents concern essentially the morphological analysis of binary images and disclose how, via erosion and dilation operations, structured images can be obtained which are exempt of irregularities and on which exact measurements can be performed. Mathematical morphology basically aims to quantify the structures and image shapes by means of relation between the image and a small closed element, referred to as a structuring element, which is displaced across the image. These relations arise from elementary erosion operations (denoted as $e \ominus g$) producing diagrammatically (the exact nature will be described in detail hereinafter) a more structured image by deficiency and dilation operations (denoted as $e \oplus g$) which, conversely, produce a more structured image by excess. Properly speaking, erosion and dilation are not morphological filters because they are not idempotent. Therefore, on the basis of erosion and dilation, morphological operations are compiled which are referred to as closing and opening operations. The closing is a dilation followed by an erosion, whilst the opening is an erosion followed by a dilation. The closing and the opening reconstruct images which are more structured and whose dimensions approximately those of the initial image; however, the closing remains larger and the opening remains smaller. In conventional echography, where the image is not binary but analog, use is made of grey-scale morphological filters which will be defined later in the description.

It will be evident that in all these operations the size of the domain D of the structuring element is very important. Actually, a large structuring element could more effectively absorb image irregularities, thus substantially reducing the "speckle" effects. However, it would at the same time lead to a deterioration of the resolution of the instrument considered. It is, therefore, attractive to find a reasonable compromise between the smoothing of the signal fluctuations and the conservation of small details. In a particular version in accordance with the invention, it has been found that the dimension of the domain D of the structuring element g preferably does not exceed the resolution of the echography device. Thus, the apparatus resolution which is decisive in the medical field is maintained. More precisely, Applicant has demonstrated that an attractive configuration is that where the dimension of the structuring element is substantially equal to half the resolution of the echography device.

The invention will be described in detail hereinafter, by way of example, with reference to the accompanying diagrammatic drawing.

Figure 1:
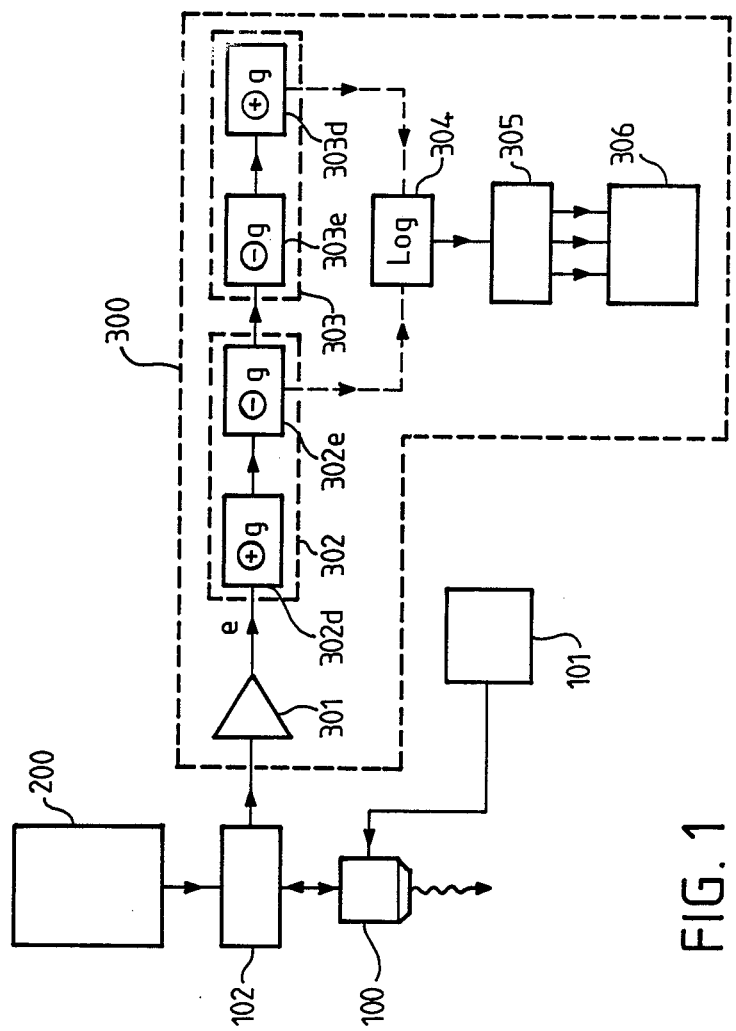
FIG. 1 shows a block diagram of an ultrasonic echography device in accordance with the invention.

FIG. 1 shows the block diagram of an ultrasonic echography device, comprising a piezoelectric transducer 100, a stage 200 for transmitting an ultrasonic beam, and a stage 300 for receiving echographic signals e returned to the transducer 100, as well as a device 101 mechanical transducer scanning control. Instead of this transducer, use could be made of an array of transducers associated with an electronic scanning control device. The transmission stage 200 comprises a conventional sequencer which is composed of an oscillator, for example having a frequency of 32 MHz, and a frequency divider which controls, at the recurrent frequency of 5 kHz, a generator whose electrical excitation signals are applied to the transducer 100 which converts these signals into periodic trains of ultrasonic pulse signals. A T/R switch 102 for separating the transmission stage 200 and the receiving and processing stage 300 is inserted between the transducer 100 and stages 200 and 300 and prevents the receiving circuits from being masked by the transmission signals.

The receiving and processing stage 300 comprises, connected to the output of the T/R switch 102, a high frequency amplifier 301 with gain compensation as a function of depth, a logarithmic compression amplifier 304, a storage and scan conversion device 305, and a display device 306. As appears from FIG. 1, the receiving and processing stage also comprises grey-tone morphological filters 302, 303 with a structuring element g in a domain D, and realized by means of erosion elements 302e, 303e and dilation elements 302d, 303d applied to the echographic signals e.

The dilation means 302d, 303d transform a two dimensional signal e(x,y) into a dilated signal D(x,y) which is given in an additive definition, by the relation:

$$D(x,y) = (e \oplus g)(x,y) = \text{Max } [e(x+x',y+y')+g(x',y')]$$

$$x',y' \Sigma D$$

Inversely, for a signal e(x,y) the erosion means 302e, 303e produce an eroded signal E(x,y) defined by:

$$E(x,y) = (e \ominus g)(x,y) = \text{Min } [e(x+x',y+y')-g(x',y')]$$

$$x',y' \Sigma D$$

Figure 2A:
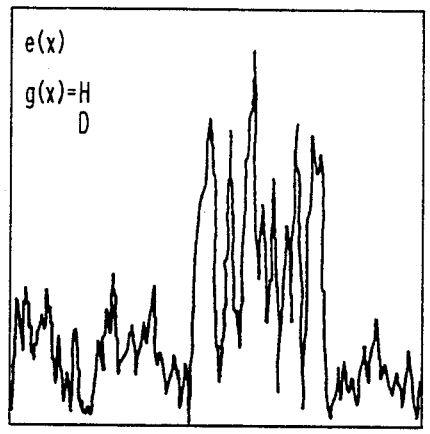
FIGS. 2a-2f show the dilation in FIG. 2b, the erosion in FIG. 2c, a closing in FIG. 2d, an opening in FIG. 2e and the closing-opening sequence in FIG. 2f of an echographic signal e in FIG. 2a in the case of a flat structuring element.
Figure 2B:
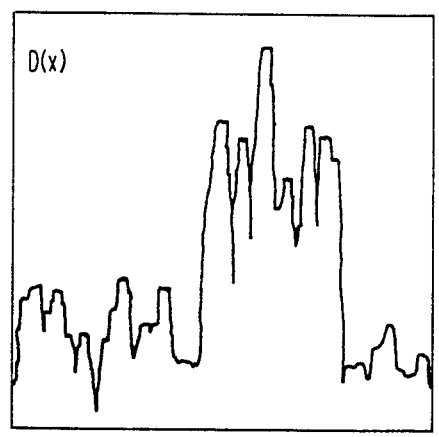
Figure 2C:
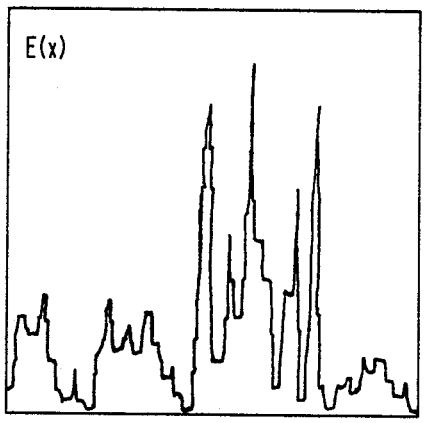

FIG. 2 FIGS. 2a and 2c respectively illustrates these two operations for an initial echographic signal e(x) which is, in the present example, the envelope of an echo representing a cyst in a scattering environment. The fluctuations of the signal which are due to speckle are clearly visible in the region of the cyst as well as in the scattering background. FIGS. 2b to 2f illustrate the various morphological operations performed on this signal by means of a structuring element g(x) which is referred to as a "flat" element and which is defined by: g(x)=0 throughout the domain D. This structuring element and the domain D are shown in FIG. 2a. In order to prevent excessive distortions from being imparted to the signal which could lead to incorrect interpretation, the domain D of the structuring element is preferably reasonably dimensioned, i.e. at the most equal to the resolution of the echography device. In the examples shown in FIGS. 2a-2f its dimension amounts to approximately half the axial resolution.

The dilation D(x) and the erosion E(x) of the signal e(x) are shown in FIGS. 2b and 2c, respectively. It appears from these Figures that the erosion (the dilation) simply replaces each sample by the local minimum (maximum) throughout the domain D of the structuring element in conformity with the relations:

$$D(x) = \text{Max } e(x+x')$$

$$x' \Sigma D$$

$$E(x) = \text{Min } e(x+x')$$

$$x' \Sigma D$$

These erosion and dilation operations enable definition of the morphological closing and opening operations. The closed F(x) of the signal e(x) is given by:

$$F(x) = [(e \oplus g) \ominus g](x)$$

Thus, it concerns an erosion applied to a dilation. This is the operation performed by the morphological filter 302 shown in FIG. 1 which is realised by way of a dilation means 302d followed by an erosion means 302e.

Inversely the opening 0(x) is given by the relation:

$$0(x) = [(e \ominus g) \oplus g](x)$$

The opening operation thus consists of an erosion followed by a dilation. The filter 303 of FIG. 1, realised by means of an erosion means 303e followed by a dilation means 303d, is an opening morphological filter.

Figure 2D:
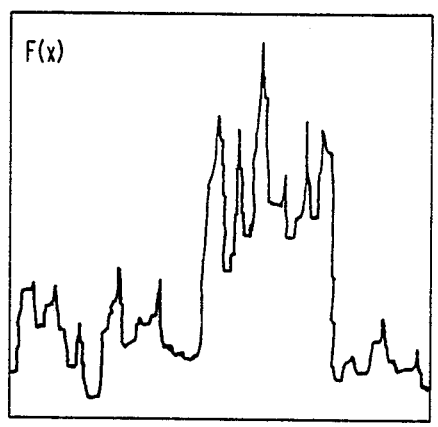
Figure 2E:
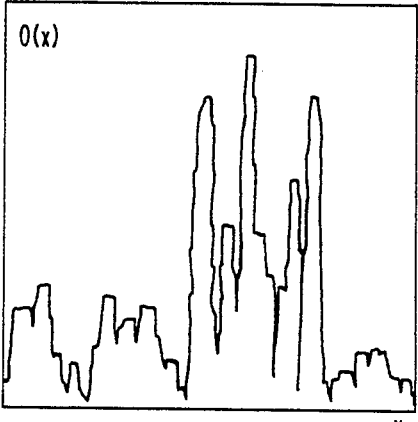
Figure 2F:
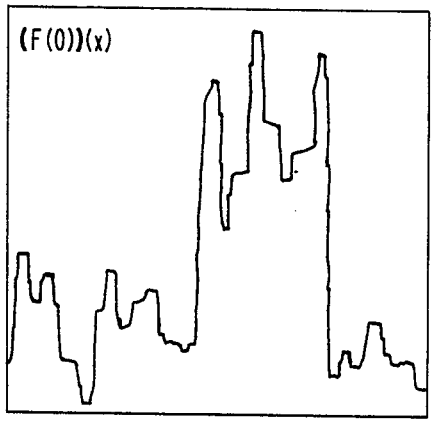

FIGS. 2d and 2e show the closed and the open, respectively of the echographic signal shown in FIG. 2a. Diagrammatically speaking, the opening (or the closed) is characterized by its ability to truncate the sharpest peaks (the dips), regardless of their absolute height (or depth). Finally, FIG. 2f shows the result of a closing-opening operation F[0(x)] performed on the echographic signal e(c) of FIG. 2a by the closing filter 302 of FIG. 2, followed by the opening filter 303.

It is to be emphasised that, as appears from FIGS. 2a-2f, the boundaries between the cyst and the scattering background are not blurred and that it is known that the perception of the image strongly depends on the quality of its contours. This represents a substantial advantage of morphological filters over, for example, a low-pass filter.

Tests performed on different images have demonstrated to Applicant that the closing filter 302 and the closing-opening filter 302-303 are most suitable for reducing speckle from a point of view of image quality improvement. Comparison of the FIGS. 2d and 2f reveals the difference between these two types of filters.

The closing filter effectively reduces the fluctuations due to the destructive interferences which produce dark spots in the image. However, the peaks relating to constructive interferences persist. The closing-opening filter truncates the latter peaks but the fine details, being smaller than the dimension of the domain of the structuring element, such as the walls of blood vessels, are less visible. Thus, it appears that the closing filter is more advantageous when the fine structures are present in the scattering environment, whilst the closing-opening filter is more useful, for example for a first step of a contour detection process.

As appears from FIGS. 2a-2f, the use of a "flat" structuring element leads to an inpleasant image appearance which is due to steep edges and severely truncated dips or peaks. Two methods can be proposed for eliminating this undesirable effect. A first method is the use of a structuring element g in the form of a voluminal element which is defined by: $g \neq 0$ in the domain D.

Figure 3:
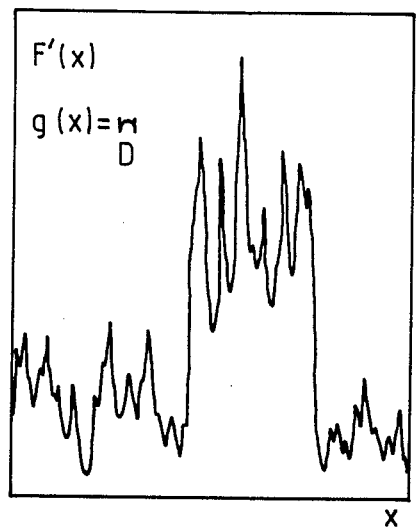
FIG. 3 shows the closing of the echographic signal of FIG. 2a in the case of a voluminal structuring element.

FIG. 3 shows the closed $F'(x)$ of the echographic signal of FIG. 2a, obtained by means of a convex structuring element $g(x)$.

The second method is the use, in the case of a voluminal structuring element, of a multiplicative definition of the erosion and dilation operations:

$$(e \ominus g)(x,y) = \mathrm{Min}\ e(x+x',y+y')g(x',y')$$

$$x',y' \Sigma D$$

$$(e \oplus g)(x,y) = \mathrm{Max}\ e(x+x',y+y') \times g(x',y')$$

$$x',y' \Sigma D$$

Figure 4:
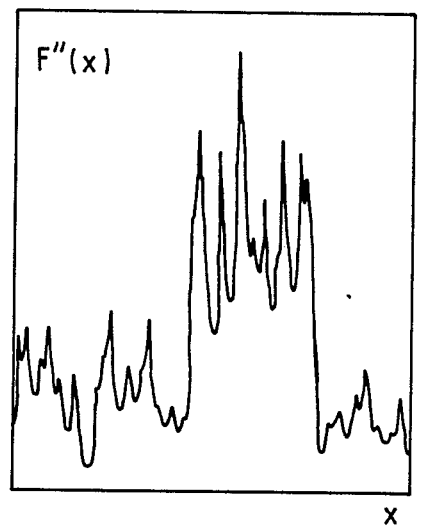
FIG. 4 shows the closing of the echographic signal of FIG. 2a in the case of a multiplicative morphology.

FIG. 4 shows the closed $F''(x)$ of the echographic signal shown in FIG. 2a, obtained by means of the above multiplicative operations.

It appears that in both cases the steep transitions become more progressive. In theory, the second method (referred to as a multiplicative method) offers better smoothing in the low-contrast zones where the peaks and valleys are less acute on average. However, the two methods lead to approximately the same results when the structuring element is suitably chosen. On the other hand it is to be noted that the additive method can be more readily carried out.

All considerations developed as regards a one-dimensional image $e(x)$ are also applicable to a two-dimensional echographic image $e(x,y)$. However, in the latter case some requirements must be imposed as regards the shape of the structuring element.

The most simple structuring element is the "flat" structuring element whose domain D is rectangular (including a square shape), the dimensions of the rectangle being adapted to the axial and the lateral resolution of the echography device. The axial resolution is generally higher than the lateral resolution.

In order to avoid the unpleasant appearance of the image due to a rectangular structuring element, it is advantageous to use a flat structuring element having a domain D which is elliptical and whose long axis (short axis) is substantially equal to half the lateral resolution (axial resolution).

Instead of using a "flat" structuring element, it is also possible to use a voluminal structuring element which can be written, for example in the form of two separate Gaussian functions:

$$g(x,y) = kg_{ax}(x)g_{lat}(y)$$

where $g_{ax}(x) = \exp(-x^2/\sigma_a^2)$ and
$g_{lat}(y) = \exp(-y^2/\sigma_l^2)$ In this case the domain D is limited to the convex part of the Gaussian functions.

It is also to be noted that in the case of an echography device with sectorial scanning the orientation of the structuring element should follow the orientation of the beam across the entire image.

What is claimed is:

1. An ultrasonic echography device, comprising at least one piezoelectric transducer, a stage for transmitting an ultrasonic beam, and a stage for receiving and processing echographic signals e returned to the at least one transducer, said receiving and processing stage comprising at least one grey-scale morphological filter, said at least one morphological filter comprising a closing filter including first dilation means followed by first erosion means applied to said echographic signals, said dilation means and erosion means being respectively defined by the following operations:

$$(e+g)(x,y) = \mathrm{Max}\ [e(x+x',y,y')+g(x',y')] \qquad (1)$$

$$x',y' \Sigma D$$

$$(e \ominus g)(x,y) = \mathrm{Min}\ [e(x+x',y,y')-g(x',y')] \qquad (2)$$

$$x',y' \Sigma D$$

wherein g is a structuring element in a domain D,
said closing filter being followed by a morphological opening filter comprising second erosion means followed by second dilation means.

2. An ultrasonic echography device as claimed in claim 1 wherein the structuring element g is a flat element defined by $g \neq 0$ in the domain D.

3. An ultrasonic echography device as claimed in claim 1 wherein the structuring element g is a voluminal element defined by $g \neq 0$ in the domain D.

4. An ultrasonic echography device, comprising at least one piezoelectric transducer a stage for transmitting an ultrasonic beam, and a stage for receiving and processing echographic signals e returned to the transducer, said receiving and processing stage comprising at least one grey-scale morphological filter, with a voluminal structuring element $g \neq 0$ in a domain D and including elementary dilation means and erosion means applied to said echographic signals, said dilation means and erosion means being respectively defined by the following operations:

$$(e+g)(x,y) = \mathrm{Max}\ [e(x+x',y,y')+g(x',y')] \qquad (1)$$

$$x',y' \Sigma D$$

$$(e \ominus g)(x,y) = \mathrm{Min}\ [e(x+x',y,y')-g(x',y')] \qquad (2)$$

$$x',y' \Sigma D$$

g being a structuring element in a domain D.

5. An ultrasonic echography device as claimed in claim 4 wherein said at least one morphological filter is a closing filter, the latter comprising a dilation means followed by an erosion means.

6. An ultrasonic echography device as claimed in claim 5 wherein said closing filter is followed by a morphological opening filter, the latter comprising an erosion means followed by a dilation means.

7. An ultrasonic echography device as claimed in any one of claims 1 or 4 wherein the dimension of the domain D of the structuring element g is at the most equal to the resolution of the echography device.

8. An ultrasonic echography device as claimed in claim 7 wherein the dimension of the domain D of the structuring element g is substantially equal to half the resolution of the echography device.

9. An ultrasonic echography device as claimed in any one of claims 1 or 4 wherein the domain D is rectangular.

10. An ultrasonic echography device as claimed in any one of claims 1 or 4 wherein the domain D is elliptical.

11. An ultrasonic echography device as claimed in claim 4 wherein the structuring element is given by:

$$g(x,y) = k g_{ax}(x) g_{lat}(y)$$

where
$g_{ax}(x) = \exp(-x^2/\sigma_a^2)$ and
$g_{lat}(y) = \exp(-y^2/\sigma_l^2)$,
the domain D being limited to the convex part of the Gaussian functions $g_{ax}(x)$ and $g_{lat}(y)$.

* * * * *